US011629753B2

(12) United States Patent
Choi et al.

(10) Patent No.: US 11,629,753 B2
(45) Date of Patent: Apr. 18, 2023

(54) ROTATION INDUCTION DEVICE FOR VEHICLE

(71) Applicants: Hyundai Mobis Co., Ltd., Seoul (KR); ILJIN CO., LTD, Gyeongju-si (KR)

(72) Inventors: Byung Joon Choi, Yongin-si (KR); Jun Mo Kang, Yongin-si (KR); Byung Hwan Kim, Namyangju-si (KR); Tae Ho Hong, Seoul (KR)

(73) Assignees: HYUNDAI MOBIS CO., LTD, Seoul (KR); ILJIN CO., LTD, Gyeongju-si (KR)

( * ) Notice: Subject to any disclaimer, the term of this patent is extended or adjusted under 35 U.S.C. 154(b) by 9 days.

(21) Appl. No.: 17/337,639

(22) Filed: Jun. 3, 2021

(65) Prior Publication Data

US 2021/0381545 A1 Dec. 9, 2021

(30) Foreign Application Priority Data

Jun. 3, 2020 (KR) .................. 10-2020-0067025

(51) Int. Cl.
| | | |
|---|---|---|
| *B60B 15/06* | (2006.01) | |
| *F16C 17/04* | (2006.01) | |
| *F16C 33/10* | (2006.01) | |
| *F16C 33/20* | (2006.01) | |
| *F16C 33/74* | (2006.01) | |

(Continued)

(52) U.S. Cl.
CPC ............ *F16C 33/102* (2013.01); *F16C 17/04* (2013.01); *F16C 33/20* (2013.01); *F16C 33/74* (2013.01); *B60G 15/068* (2013.01); *F16C 35/02* (2013.01); *F16C 2326/05* (2013.01)

(58) Field of Classification Search
CPC ........ F16C 17/04; F16C 17/18; F16C 33/102; F16C 33/20; F16C 33/74; F16C 35/02; F16C 2326/05; B60G 15/067; B60G 15/068; B60G 2204/418; B60G 2206/71
See application file for complete search history.

(56) References Cited

U.S. PATENT DOCUMENTS

| | | | | |
|---|---|---|---|---|
| 2014/0010491 A1* | 1/2014 | Lutz | ...................... | F16C 33/761 384/607 |
| 2014/0270609 A1* | 9/2014 | Morishige | ............... | F16C 33/80 384/144 |
| 2015/0354629 A1* | 12/2015 | Sakairi | ................. | B60G 15/068 384/420 |

FOREIGN PATENT DOCUMENTS

| | | | |
|---|---|---|---|
| JP | H04105218 U | * | 9/1992 |
| KR | 10-2020-0033219 A | | 3/2020 |

OTHER PUBLICATIONS

Machine Translation of JP-H04105218-U (Year: 1992).*

* cited by examiner

*Primary Examiner* — Alan B Waits
(74) *Attorney, Agent, or Firm* — NSIP Law

(57) ABSTRACT

A rotation induction device for a vehicle, includes an upper case member, a lower case member, a center plate, and an inflow prevention part. The upper case member has a piston rod disposed therethrough. The lower case member, disposed under the upper case member, has the piston rod disposed therethrough. The center plate, disposed between the upper and lower case members such that the piston rod passes through the center plate, is configured to induce either one or both of the upper and lower case members to rotate. The inflow prevention part, formed in the upper and lower case members, is configured to block the inflow of foreign matters. Each of the upper case member, the lower case member, and the center plate is composed of a synthetic resin material.

15 Claims, 12 Drawing Sheets

(51) Int. Cl.
*B60G 15/06* (2006.01)
*F16C 35/02* (2006.01)

74  73

ROTATION INDUCTION DEVICE FOR VEHICLE

CROSS-REFERENCE TO RELATED APPLICATION

This application claims the benefit under 35 USC 119(a) of Korean Patent Application No. 10-2020-0067025, filed on Jun. 3, 2020 in the Korean Intellectual Property Office, the entire disclosure of which is incorporated herein by reference for all purposes.

BACKGROUND

Field

Exemplary embodiments of the present disclosure relate to a rotation induction device for a vehicle, and more particularly, to a rotation induction device for a vehicle, in which a bearing used in a suspension of a vehicle is manufactured of synthetic resin to improve operability.

Discussion of the Background

In general, a vehicle employs a strut-type suspension configured by combining a coil spring with a strut assembly which has a hydraulic shock absorber embedded in an outer shell integrated with a main shaft. The strut assembly may have two kinds of configurations. According to the first configuration, a piston rod of the strut assembly is rotated when the strut assembly is rotated with the coil spring during a steering operation. According to the second configuration, the piston rod of the strut assembly is not rotated when the strut assembly is rotated with the coil spring during a steering operation. In order to smoothly allow the rotation of the strut assembly, a bearing is used between a mounting member of a vehicle body and an upper spring support seat of the coil spring.

As the bearing, a rolling bearing using a ball or needle is applied. The ball or needle of the rolling bearing may be fatigue-damaged by minute shaking, vibration load or the like, which makes it difficult to maintain a smooth steering operation. Therefore, there is a need for a device capable of solving the problem.

The related art of the present disclosure is disclosed in Korean Patent Application Laid-Open No. 2020-0033219 published on Mar. 27, 2020 and entitled "Strut Bearing Assembly for Suspension".

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rotation induction device for a vehicle, includes an upper case member, a lower case member, a center plate, and an inflow prevention part. The upper case member has a piston rod disposed therethrough. The lower case member, disposed under the upper case member, has the piston rod disposed therethrough. The center plate, disposed between the upper and lower case members such that the piston rod passes through the center plate, is configured to induce either one or both of the upper and lower case members to rotate. The inflow prevention part, formed in the upper and lower case members, is configured to block the inflow of foreign matters. Each of the upper case member, the lower case member, and the center plate is composed of a synthetic resin material.

The upper case member may include an upper through-part having an upper hole formed in a center thereof such that the piston rod passes through the upper hole, an upper cover extended outward from the upper through-part, and configured to cover the top of the center plate, and an upper protrusion protruding downward from the upper cover, and configured to restrict movement of the center plate.

The lower case member may include a lower through-part having a lower hole formed in a center thereof such that the piston rod passes through the lower hole, a lower cover extended outward from the lower through-part, and configured to cover the bottom of the center plate, and a lower protrusion protruding upward from the lower cover, and configured to restrict movement of the center plate.

The inflow prevention part may include a prevention hook part extended downward from an edge of the upper case member, a prevention locking part formed at an edge of the lower case member, and formed as a groove to which the prevention hook part is locked and fixed, and a prevention dropping part extended from a bottom of the lower case member, and configured to drop foreign matters, introduced into the prevention locking part, downward.

The prevention hook part may have a hook inclined surface formed thereon, and the prevention dropping part may have a dropping inclined surface facing the hook inclined surface to correspond to the hook inclined surface.

The inflow prevention part may further include a pair of prevention lower protrusions protruding upward from the lower case member, and a prevention upper protrusion protruding downward from the upper case member, inserted between the prevention lower protrusions, and configured to prevent the inflow of foreign matters.

The rotation induction may further include a push prevention part formed in the upper case member to prevent the push of the upper case member.

The push prevention part may include a plurality of push prevention parts, each spaced apart from another, protruding toward the piston rod.

The push prevention parts may be formed in a circumferential direction along an inner circumferential surface of the upper case member.

The push prevention parts may be formed in a top-to-bottom direction along an inner circumferential surface of the upper case member.

In another general aspect, a rotation induction device for a vehicle includes a first synthetic resin material member, a second synthetic resin material member, a third synthetic resin material member, and an inflow prevention part. The first synthetic resin material member has a piston rod disposed therethrough. The second synthetic resin material member, disposed under the first synthetic resin material member, has the piston rod disposed therethrough. The third synthetic resin material member, disposed between the first and second synthetic resin material members such that the piston rod passes through the third synthetic resin material member, is configured to induce either one or both of the first and second synthetic resin material members to rotate. The inflow prevention part, formed in the first and second synthetic resin material members, is configured to block the inflow of foreign matters.

The first synthetic resin material member may be an upper case member, the second synthetic resin material member may be a lower case member, and the third synthetic resin material member may be a center plate.

The first synthetic resin material member may include an upper through-part having an upper hole formed in a center thereof such that the piston rod passes through the upper hole, an upper cover extended outward from the upper through-part, and configured to cover the top of the third synthetic resin material member, and an upper protrusion protruding downward from the upper cover, and configured to restrict movement of the third synthetic resin material member.

The second synthetic resin material member may include a lower through-part having a lower hole formed in a center thereof such that the piston rod passes through the lower hole, a lower cover extended outward from the lower through-part, and configured to cover the bottom of the third synthetic resin material member, and a lower protrusion protruding upward from the lower cover, and configured to restrict movement of the third synthetic resin material member.

The inflow prevention part may include a prevention hook part extended downward from an edge of the first synthetic resin material member, a prevention locking part formed at an edge of the second synthetic resin material member, and formed as a groove to which the prevention hook part is locked and fixed, and a prevention dropping part extended from a bottom of the second synthetic resin material member, and configured to drop foreign matters, introduced into the prevention locking part, downward.

Other features and aspects will be apparent from the following detailed description, the drawings, and the claims.

DETAILED DESCRIPTION OF THE ILLUSTRATED EMBODIMENTS

Hereinafter, a rotation induction device for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Various embodiments are directed to a rotation induction device for a vehicle, in which a bearing used in a suspension of a vehicle is manufactured of synthetic resin to improve operability.

In the rotation induction device for a vehicle in accordance with the embodiment of the present disclosure, the inflow prevention part may be formed in the upper and lower cases so as to prevent the inflow of foreign matters in a stepwise manner. Thus, the inflow prevention part may block the foreign matter from penetrating into the sliding region, thereby preventing a reduction in rotational force.

Figure 1:
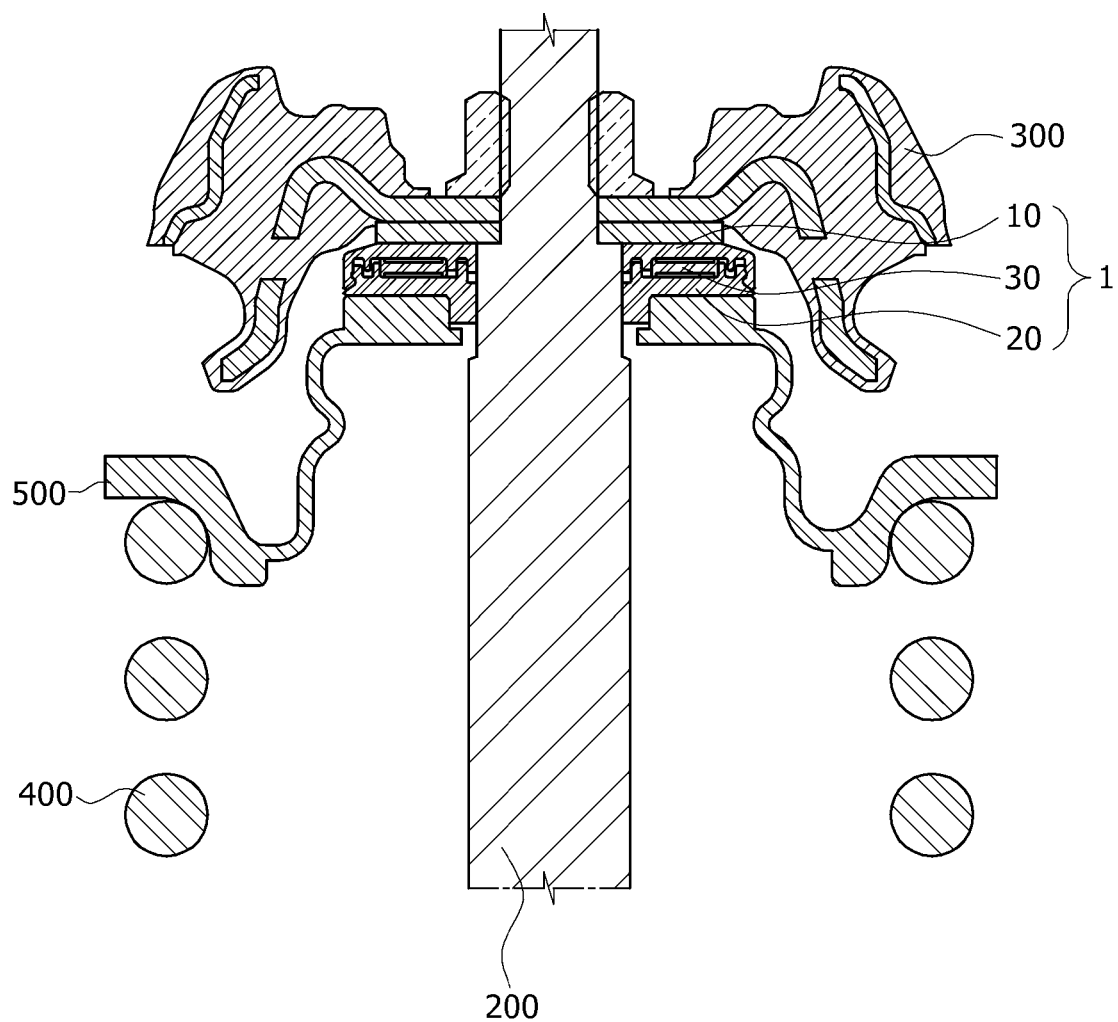
FIG. 1 is a diagram schematically illustrating that a rotation induction device for a vehicle in accordance with an embodiment of the present disclosure is installed.
Figure 2:
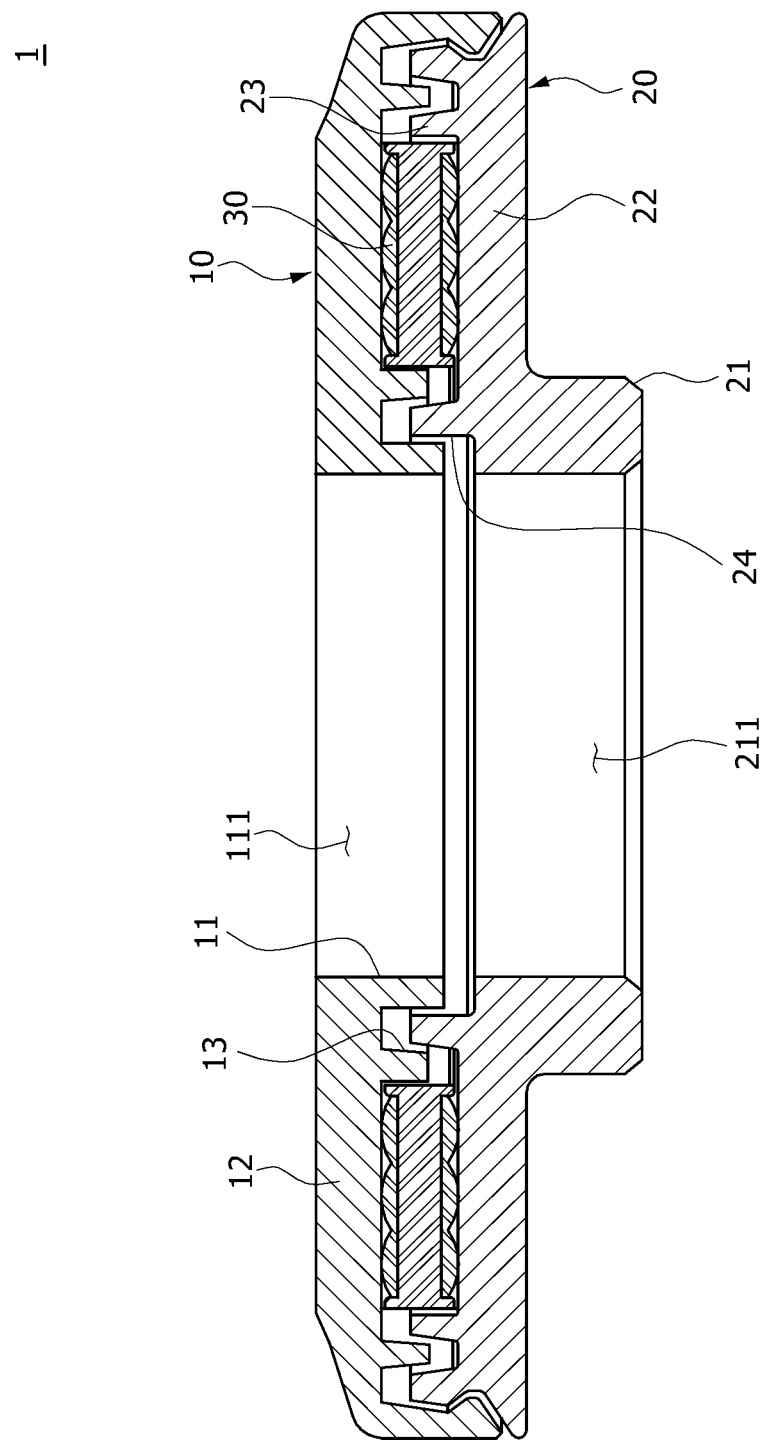
FIG. 2 is a diagram schematically illustrating the rotation induction device for a vehicle in accordance with the embodiment of the present disclosure.

FIG. 1 is a diagram schematically illustrating that a rotation induction device for a vehicle in accordance with an embodiment of the present disclosure is installed, and FIG. 2 is a diagram schematically illustrating the rotation induction device for a vehicle in accordance with the embodiment of the present disclosure. Referring to FIGS. 1 to 2, a rotation induction device 1 for a vehicle in accordance with the embodiment of the present disclosure includes an upper case 10, a lower case 20 and a center plate 30.

The upper case 10 is formed of synthetic resin, and has a piston rod 200 disposed therethrough. For example, the upper case 10 may have a hole formed in a center thereof such that the piston rod 200 passes through the hole, and an insulator 300 may be disposed over the upper case 10.

The lower case 20 is formed of synthetic resin, and disposed under the upper case 10 such that the piston rod 200 passes through the lower case 20. For example, the lower case 20 may have a hole formed in a center thereof such that the piston rod 200 passes through the hole, and a seat 500 may be disposed under the lower case 20 so as to support the top of a spring 400.

The center plate 30 is formed of a synthetic resin material, and disposed between the upper case 10 and the lower case 20 such that the piston rod 200 passes through the center plate 30. The center plate 30 induces the rotation of any one of the upper case 10 and the lower case 20. For example, the top surface of the center plate 30 may be contacted with the upper case 10, and the bottom surface of the center plate 30 may be contacted with the lower case 20. The center plate 30 may induce the contact surface to slide, and eventually induce the lower case 20 to rotate.

The upper case 10 in accordance with the embodiment of the present disclosure includes an upper through-part 11, an upper cover 12 and an upper protrusion 13.

The upper through-part 11 has an upper hole 111 formed in a center thereof such that the piston rod 200 passes through the upper hole 111. For example, the upper through-part 11 may be formed in a cylindrical shape through which the piston rod 200 passes.

The upper cover 12 is extended from the upper through-part 11 to the outside, and covers the top of the center plate 30. For example, the upper cover 12 may be extended outward from the top of the upper through-part 11.

The upper protrusion 13 protrudes downward from the upper cover 12 so as to restrict the movement of the center plate 30. For example, the upper protrusion 13 may be extended downward from the bottom surface of the upper cover 12 so as to face the upper through-part 11. The inside of the center plate 30 may be supported by the outer surface of the upper protrusion 13, such that the movement of the center plate 30 is suppressed.

The lower case 20 in accordance with the embodiment of the present disclosure includes a lower through-part 21, a lower cover 22 and a lower protrusion 23.

The lower through-part 21 has a lower hole 211 formed in a center thereof such that the piston rod 200 passes through the lower hole 211. For example, the lower through-part 21 may be formed in a cylindrical shape through which the piston rod 200 passes.

The lower cover 22 is extended outward from the lower through-part 21, and covers the bottom of the center plate 30. For example, the lower cover 22 may be extended outward from the top of the lower through-part 21.

The lower protrusion 23 protrudes upward from the lower cover 22 so as to restrict the movement of the center plate 30. For example, the lower protrusion 23 may be extended upward from the top of the lower cover 22, and the outside of the center plate 30 may be supported by the inner surface of the lower protrusion 23, such that the movement of the center plate 30 is suppressed.

The lower case 20 may further include a lower insertion part 24. The lower insertion part 24 may protrude upward from the lower cover 22 so as to be inserted into a space formed between the upper through-part 11 and the upper protrusion 13. The lower insertion part 24 may support the outside of the upper through-part 11, thereby suppressing the upper and lower cases 10 and 20 from moving in a side-to-side direction.

Figure 3:
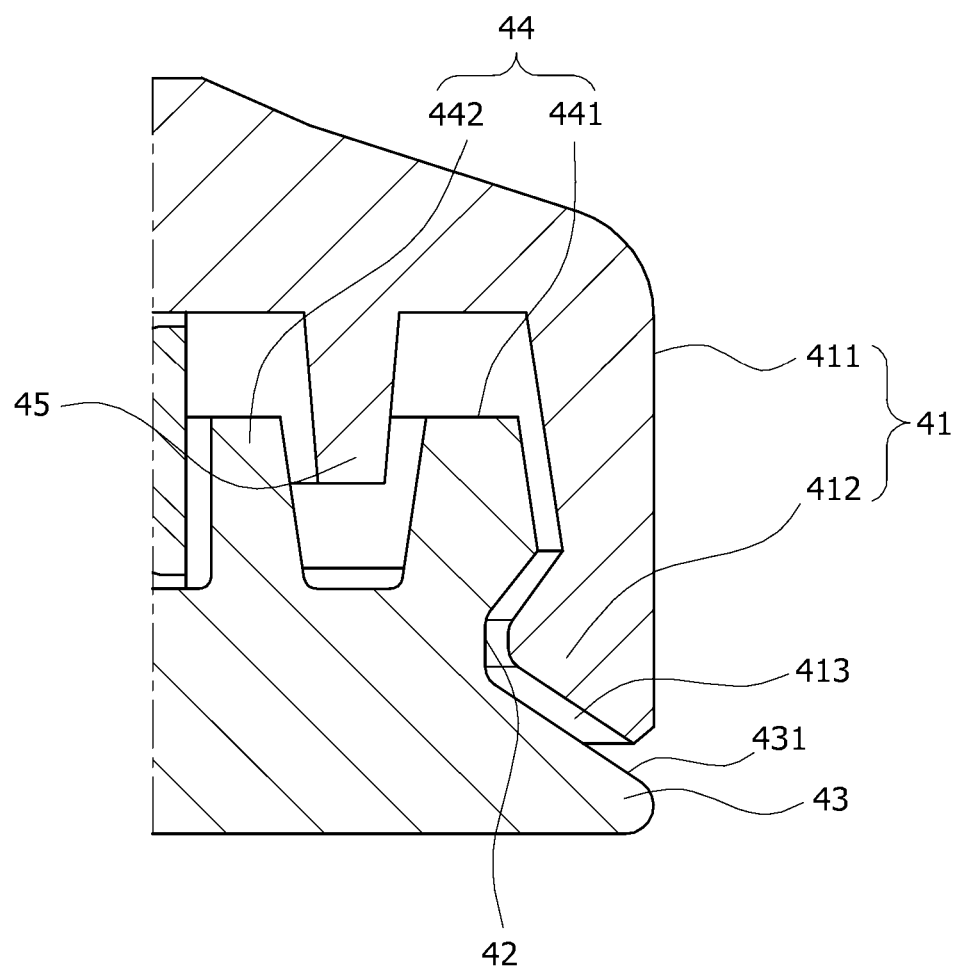
FIG. 3 is a diagram schematically illustrating an inflow prevention part in accordance with the embodiment of the present disclosure.

FIG. 3 is a diagram schematically illustrating an inflow prevention part in accordance with the embodiment of the present disclosure. Referring to FIG. 3, the rotation induction device 1 for a vehicle in accordance with the embodiment of the present disclosure may further include an inflow prevention part 40. The inflow prevention part 40 is formed in the upper and lower cases 10 and 20 and serves to block the inflow of foreign matters. For example, the inflow prevention part 40 may prevent the inflow of foreign matters from the outside, while inducing the coupling between the upper and lower cases 10 and 20.

The inflow prevention part 40 in accordance with the embodiment of the present disclosure includes a prevention hook part 41, a prevention locking part 42 and a prevention dropping part 43.

The prevention hook part 41 is extended downward from the edge of the upper case 10. For example, the prevention hook part 41 may include a hook extension 411 protruding downward from the edge of the upper case 10 and a hook protrusion 412 protruding inwardly from the bottom of the hook extension 411 so as to be locked and fixed to the prevention locking part 42.

The prevention locking part 42 is formed at the edge of the lower case 20, and formed as a groove to which the prevention hook part 41 is locked and fixed. For example, the prevention locking part 42 may be formed on the outer circumferential surface of the lower case 20, and the hook protrusion 412 may be inserted into the prevention locking part 42 and then locked and fixed to the prevention locking part 42. Thus, fluid introduced between the prevention hook part 41 and the prevention locking part 42 flows backward due to the shapes of the prevention hook part 41 and the prevention locking part 42, which makes it possible to suppress the inflow of foreign matters.

The prevention dropping part 43 is extended from the bottom of the lower case 20, and drops foreign matters introduced into the prevention locking part 42 downward. For example, the prevention dropping part 43 may be extended from an outer lower end of the lower cover 22, and the prevention locking part 42 may be formed at the top of the prevention dropping part 43.

At this time, the prevention hook part 41 has a hook inclined surface 413 formed thereon, and the prevention dropping part 43 has a dropping inclined surface 431 formed thereon so as to face the hook inclined surface 413. The space between the hook inclined surface 413 and the dropping inclined surface 431 may be so narrow as to suppress foreign matters from flowing into the prevention locking part 42. The hook inclined surface 413 may be formed at the bottom of the hook protrusion 412, and the hook inclined surface 413 and the dropping inclined surface 431 may be obliquely formed so that foreign matters contained in the air introduced therebetween flow down to the outside.

The inflow prevention part 40 in accordance with the embodiment of the present disclosure may further include a pair of prevention lower protrusions 44 and a prevention upper protrusion 45.

The pair of prevention lower protrusions 44 protrude upward from the lower case 20. For example, the pair of prevention lower protrusions 44 may include a first protrusion 441 extended upward from the edge top surface of the lower cover 22 and a second protrusion 442 extended upward from the top surface of the lower cover 22 so as to face the first protrusion 441. At this time, the second protrusion 442 may be formed to have a larger height than the first protrusion 441, and replaced with the lower protrusion 23.

The prevention upper protrusion 45 protrudes downward from the upper case 10, and is inserted between the prevention lower protrusions 44 so as to block the inflow of foreign matters. For example, since the bottom of the prevention upper protrusion 45 is located at a lower level than the top of the first protrusion 441, floating foreign matters may be caught by the prevention upper protrusion 45 and drop down to the space between the first and second protrusions 441 and 442.

Therefore, when the inflow prevention part 40 for preventing the inflow of foreign matters between the upper and lower cases 10 and 20 is formed, foreign matters are suppressed from flowing into the gap between the prevention hook part 41 and the prevention dropping part 43. Furthermore, foreign matters may rapidly drop down through the inclined surface of the prevention dropping part 43, which makes it possible to prevent rotational friction or damage caused by accumulated foreign matters.

When fine foreign matters pass through the space between the prevention hook part 41 and the prevention dropping part 43, the foreign matters may flow backward through the space between the prevention hook part 41 and the prevention locking part 42, thereby being dropping down to the outside through the prevention dropping part 43. The foreign matters having passed through the space between the prevention hook part 41 and the prevention locking part 42 may be caught by the prevention upper protrusion 45 and drop to the prevention lower protrusions 44. At this time, since the second protrusion 442 has a larger height than the first protrusion 441, foreign matters do not reach the center plate 30 over the second protrusion 442. Thus, since the foreign matters are blocked from flowing between the center plate 30 and the upper case 10 or the lower case 20, it is possible to prevent an increase in rotation friction and part damage, which may be caused by the inflow of the foreign matters.

Figure 4:
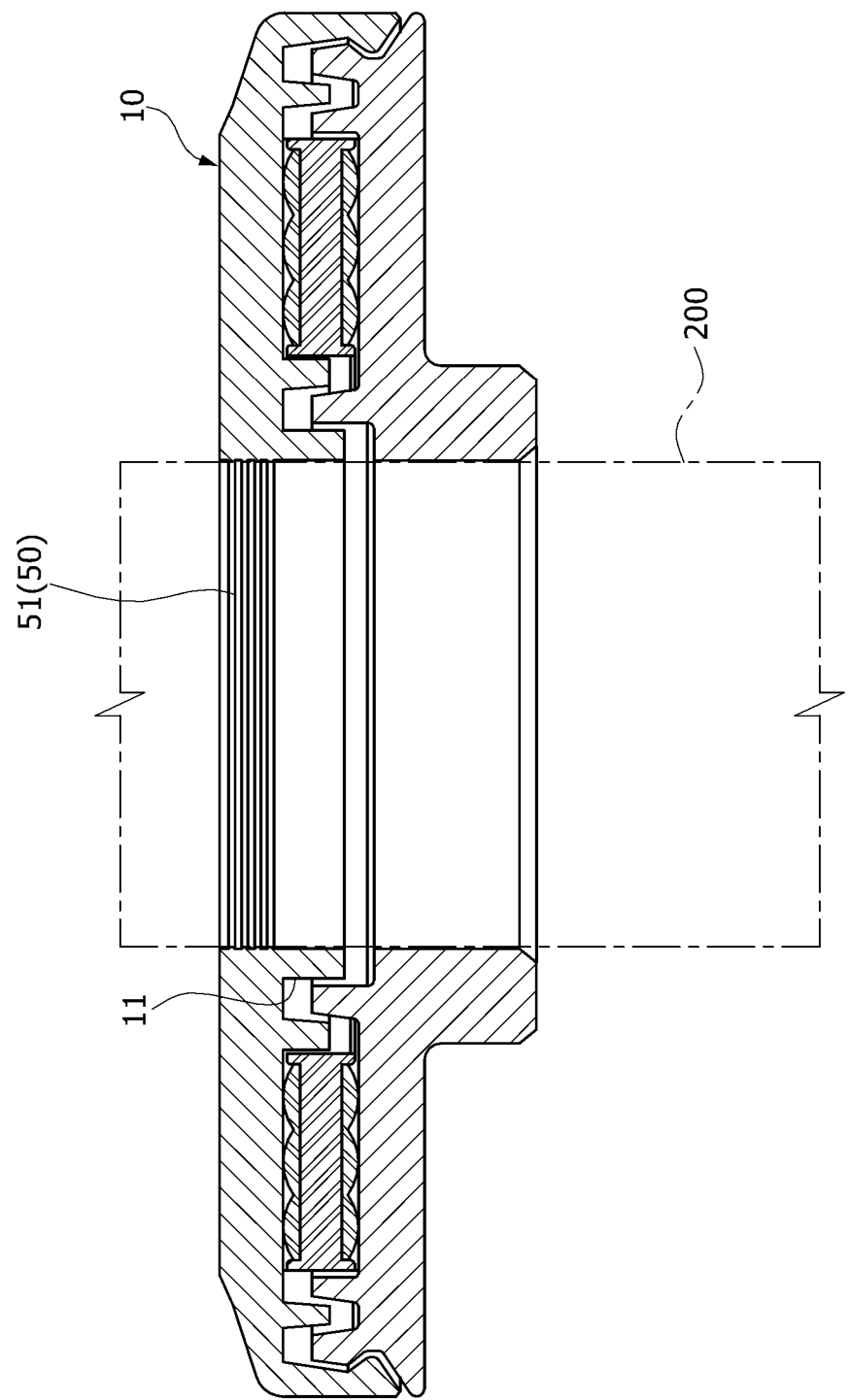
FIG. 4 is a diagram schematically illustrating a first embodiment of a push prevention part in accordance with the embodiment of the present disclosure.
Figure 5:
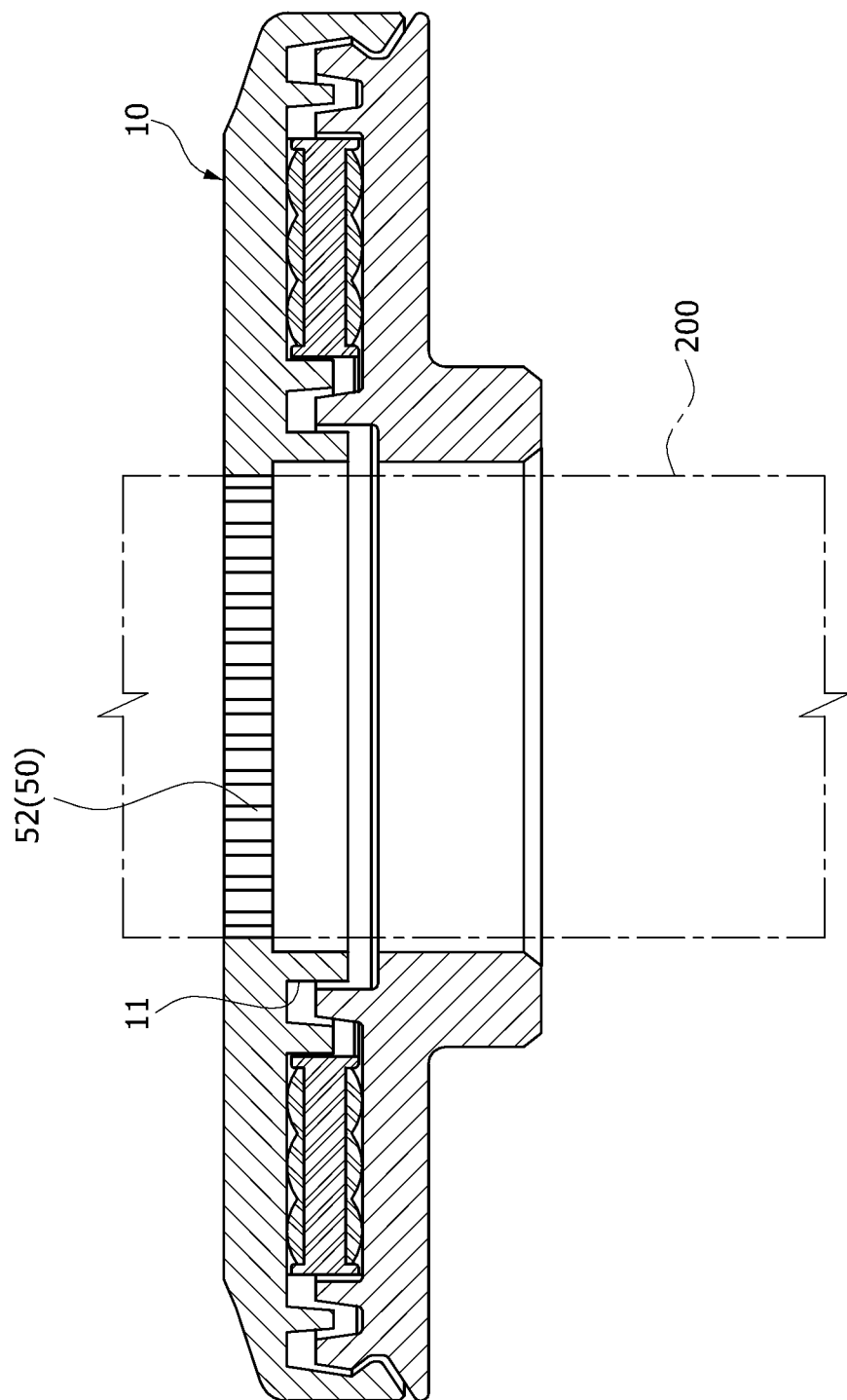
FIG. 5 is a diagram schematically illustrating a second embodiment of the push prevention part in accordance with the embodiment of the present disclosure.

FIG. 4 is a diagram schematically illustrating a first embodiment of a push prevention part in accordance with the embodiment of the present disclosure, and FIG. 5 is a diagram schematically illustrating a second embodiment of the push prevention part in accordance with the embodiment of the present disclosure. Referring to FIGS. 4 and 5, the rotation induction device 1 for a vehicle in accordance with the embodiment of the present disclosure may further include a push prevention part 50. The push prevention part 50 is formed in the upper case 10, and serves to prevent the push of the upper case 10.

That is, in order to guarantee the assembly performance of the piston rod 200, a space is formed between the piston rod 200 and the upper and lower cases 10 and 20. Thus, when a horizontal load is generated, interference occurs between the upper and lower cases 10 and 20. Such interference may degrade sealing performance and have an influence on the increase in torque, and the push prevention part 50 may be placed adjacent to the piston rod 200 or pressed against the piston rod 200 so as to endure the horizontal load.

In the embodiment of the present disclosure, a plurality of push prevention parts 50 are formed in the upper through-part 11, and protrude toward the piston rod 200 so as to be spaced apart from one another. For example, the push prevention part 50 may be integrated with the upper through-part 11, or manufactured as a separate part and mounted in the upper through-part 11.

The push prevention part 50 in accordance with the first embodiment is formed in the circumferential direction along the inner circumferential surface of the upper through-part 11. Referring to FIG. 4, a first push prevention part 51 may protrude from the inner circumferential surface of the upper through-part 11 so as to be pressed against the piston rod 200 passing through the upper through-part 11. For example, the first push prevention part 51 may be disposed at the inside top of the upper through-part 11. The plurality of first push prevention parts 51 may be disposed in the upper through-part 11 from the middle point to the top thereof so as to be spaced apart from one another.

The push prevention part 50 in accordance with the second embodiment is formed in a top-to-bottom direction along the inner circumferential surface of the upper through-part 11. Referring to FIG. 5, a second push prevention part 52 may protrude from the inner circumferential surface of the upper through-part 11 so as to be pressed against the piston rod 200 passing through the upper through-part 11. For example, the second push prevention part 52 may be disposed at the inside top of the upper through-part 11. The plurality of second push prevention parts 52 may be formed in the upper through-part 11 so as to have a length from the middle point to the top of the upper through-part 11. The plurality of second push prevention parts 52 may be disposed along the inner circumferential surface of the upper through-part 11 so as to be spaced apart from one another.

Besides, the first push prevention part 51 and the second push prevention part 52 may be mixedly used, and any one or more of the first and second push prevention parts 51 and 52 may be formed on the entire inner circumferential surface of the upper through-part 11.

When the push prevention part 50 is formed in the upper case 10, the push prevention part 50 may be pressed against the piston rod 200, and prevent the interference between the upper and lower cases 10 and 20 by a horizontal load, thereby maintaining stable rotation of the lower case 20.

Figure 6:
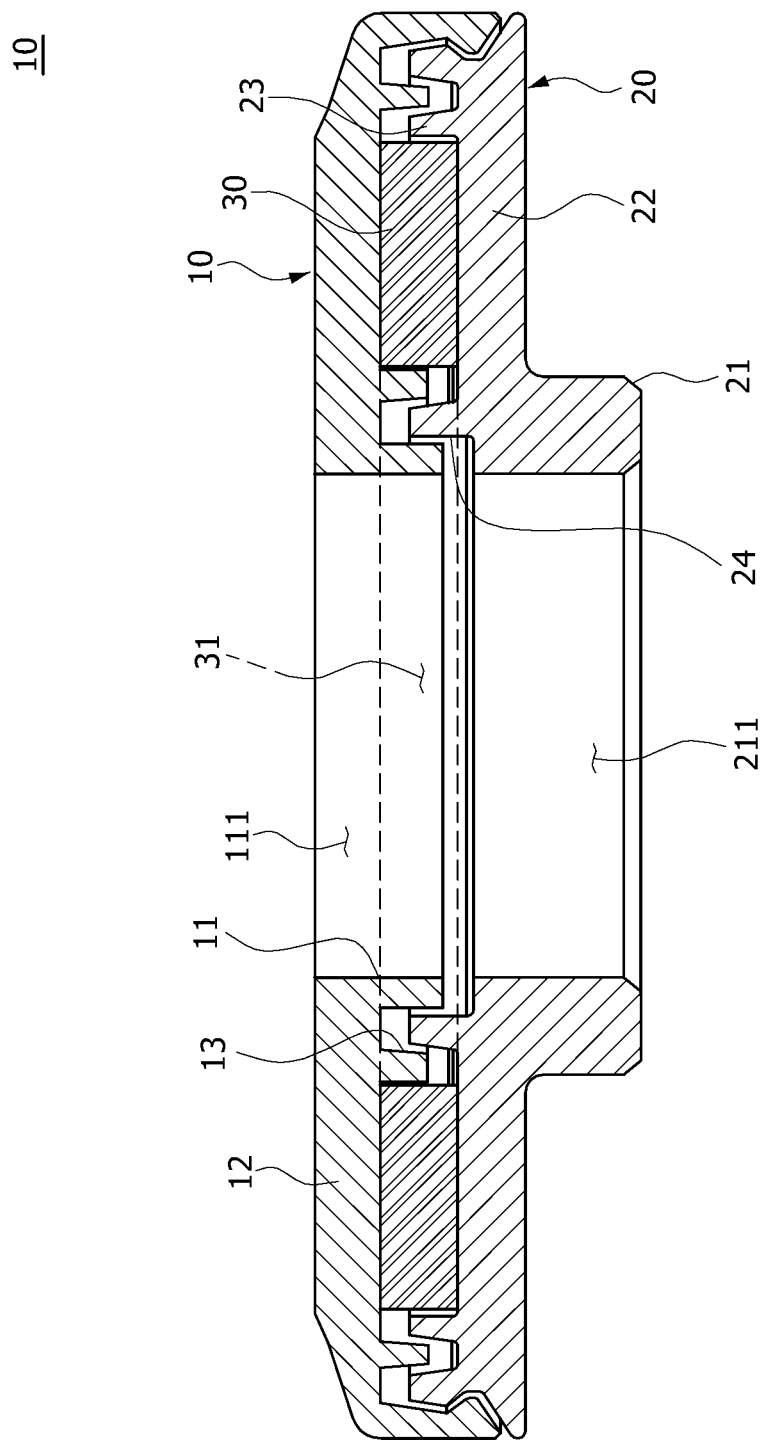
FIG. 6 is a diagram schematically illustrating a center plate in accordance with the embodiment of the present disclosure.

FIG. 6 is a diagram schematically illustrating the center plate in accordance with the embodiment of the present disclosure. Referring to FIG. 6, the center plate 30 in accordance with the embodiment of the present disclosure has a plate hole 31 formed in a center thereof such that the piston rod 200 passes through the plate hole 31, and is disposed between the upper protrusion 13 and the lower protrusion 23. For example, the center plate 30 may be formed in a plate shape with the plate hole 31 formed in a center thereof, and the top surface of the center plate 30 may be contacted with the upper cover 12 and the bottom surface of the center plate 30 may be contacted with the lower cover 22, thereby inducing the rotation of the lower cover 22.

Figure 7:
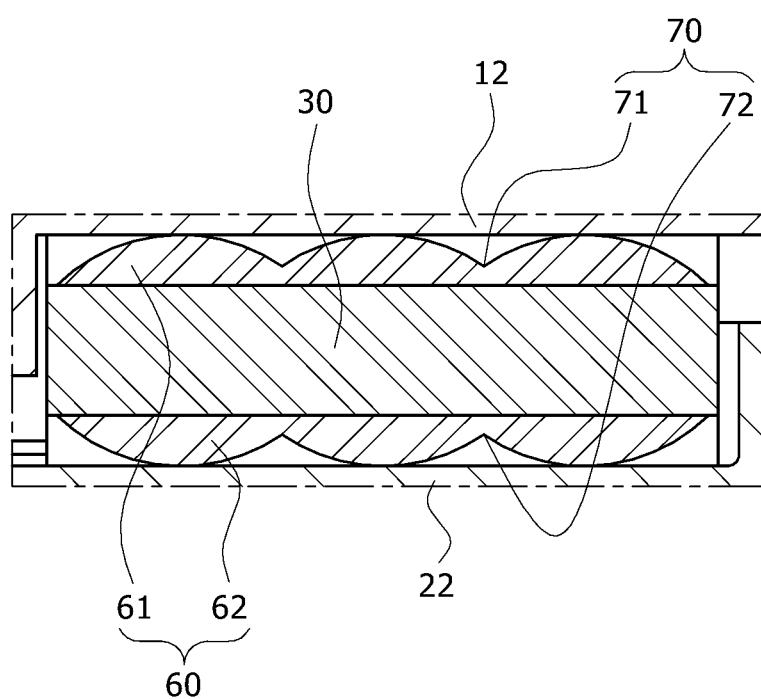
FIG. 7 is a diagram schematically illustrating a stress distribution part in accordance with the embodiment of the present disclosure.

FIG. 7 is a diagram schematically illustrating a stress distribution part in accordance with the embodiment of the present disclosure. Referring to FIG. 7, the rotation induction device 1 for a vehicle in accordance with the embodiment of the present disclosure may further include a stress distribution part 60. The stress distribution part 60 is formed on the center plate 30 and serves to distribute stress caused by a vertical load. For example, the stress distribution part 60 may be formed at the top and bottom of the center plate 30, and directly contacted with the upper and lower covers 12 and 22.

The stress distribution part 60 in accordance with the embodiment of the present disclosure includes an upper distribution part 61 and a lower distribution part 62.

The upper distribution part 61 protrudes from the top surface of the center plate 30 so as to be contacted with the upper cover 12, and the lower distribution part 62 protrudes from the bottom surface of the center plate 30 so as to be contacted with the lower cover 22. At this time, the upper distribution part 61 may have a curved surface to reduce the contact area with the upper cover 12, and the lower distribution part 62 may have a curved surface to reduce the contact area with the lower cover 22. In particular, each of the upper and lower distribution parts 61 and 62 may be formed to have one or more cycloid surfaces, and thus distribute stress concentrated by a vertical load. For example, three or four upper distribution parts 61 and three or four lower distribution parts 62 may be formed to each have a cross-section formed in a cycloid shape from the inner circumferential surface toward the outer circumferential surface of the center plate 30.

Lubricant is stored in the space formed between the cycloid surfaces. For example, since the connection point between the cycloid surfaces adjacent to each other corresponds to the lowest point of each cycloid surface, a recess may be formed between the cycloid surfaces, and lubricant such as grease may be stored in the recess.

The upper distribution parts 61 and the lower distribution parts 62 may be additionally attached to the top surface and the bottom surface of the center plate 30 of FIG. 6, respectively, and formed as one body with the center plate 30 in order to increase the stiffness of the center plate 30.

Figure 8:
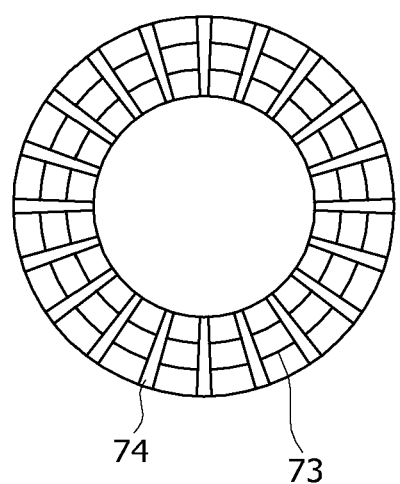
FIG. 8 is a bottom view schematically illustrating a lubricant storage part in accordance with the embodiment of the present disclosure.
Figure 9:
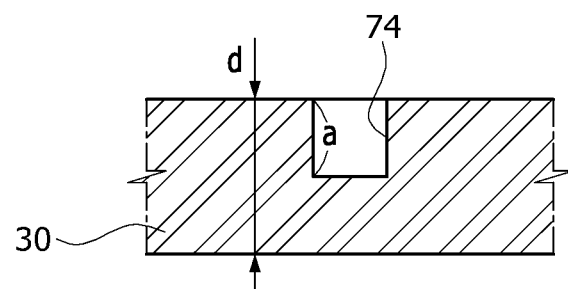
FIG. 9 is a cross-sectional view schematically illustrating the lubricant storage part in accordance with the embodiment of the present disclosure.

FIG. 8 is a bottom view schematically illustrating a lubricant storage part in accordance with the embodiment of the present disclosure, and FIG. 9 is a cross-sectional view schematically illustrating the lubricant storage part in accordance with the embodiment of the present disclosure. Referring to FIGS. 8 and 9, the rotation induction device 1 for a vehicle in accordance with the embodiment of the present disclosure may further include a lubricant storage part 70.

The lubricant storage part 70 in accordance with the embodiment of the present disclosure may be formed as a space over the center plate 30 so as to store lubricant therein.

More specifically, the lubricant storage part 70 may include an upper storage part 71 and a lower storage part 72 (see FIG. 7).

The upper storage part 71 is formed at the top surface of the center plate 30 so as to store lubricant therein. For example, the upper storage part 71 may be formed in a recessed shape at the top surface of the center plate 30, in order to store lubricant therein. Besides, when the upper distribution part 61 is formed on the top surface of the center plate 30, the upper storage part 71 may be formed in the upper distribution part 61.

The lower storage part 72 is formed at the bottom surface of the center plate 30 so as to store lubricant therein. For example, the lower storage part 72 may be formed in a recessed shape at the bottom surface of the center plate 30, in order to store lubricant therein. Besides, when the lower distribution part 62 is formed on the bottom surface of the center plate 30, the lower storage part 72 may be formed in the lower distribution part 62.

The upper storage parts 71 and the lower storage parts 72 each form a circumferential groove 73 formed along a concentric circle. For example, a plurality of circumferential grooves 73 may be formed on each of the top and bottom surfaces of the center plate 30 so as to store lubricant therein. Besides, when the upper distribution part 61 and the lower distribution part 62 have curved surfaces, the space between the curved surfaces may become the circumferential groove 73.

The upper storage parts 71 and the lower storage parts 72 each form radial grooves 74. For example, the plurality of radial grooves 74 may be formed on each of the top and bottom surfaces of the center plate 30 so as to store lubricant therein. Besides, when the upper and lower distribution parts 61 and 62 are formed, the plurality of radial grooves 74 may be radially formed in the upper and lower distribution parts 61 and 62 so as to be spaced apart from each other.

When the circumferential grooves 73 and the radial grooves 74 are mixedly used, the numbers of the circumferential grooves 73 and the radial grooves 74 may be changed according to the size of the center plate 30. Furthermore, the circumferential grooves 73 and the radial grooves 74 may communicate with each other. Thus, when the center plate 30 is rotated, the lubricant stored in the radial grooves 74 may be supplied to the circumferential grooves 73.

The radial groove 74 is designed to have a depth (a) corresponding to 10% to 50% of the thickness (d) of the center plate 30. For example, the depth (a) of the radial groove 74 may be larger than the depth of the circumferential groove 73, and the radial groove 74 may be designed to have a uniform depth from the top and bottom of the center plate 30 without a phase difference. The depth (a) of the radial groove 74 may be designed in a different manner depending on the stiffness of the center plate 30 and a required amount of lubricant to be stored therein.

When the upper distribution part 61 and the lower distribution part 62 are formed on the center plate 30, the distance between the top points of the upper and lower distribution parts 61 and 62 may correspond to the thickness (d) of the center plate 30.

Figure 10:
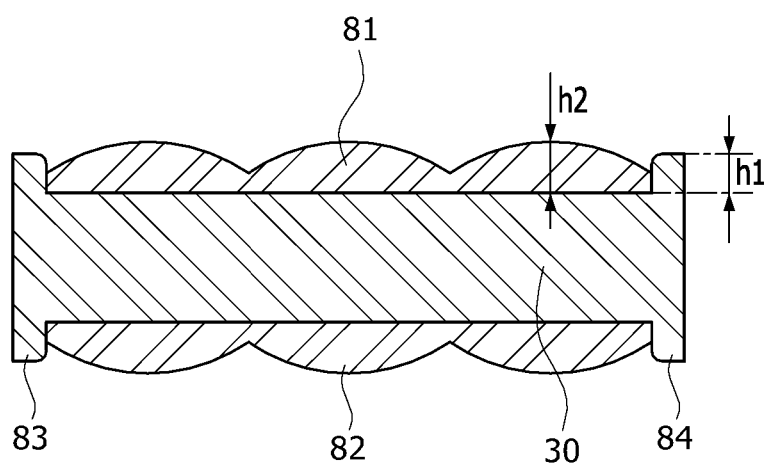
FIG. 10 is a diagram schematically illustrating a reinforcement part in accordance with the embodiment of the present disclosure.

FIG. 10 is a diagram schematically illustrating a reinforcement part in accordance with the embodiment of the present disclosure. Referring to FIG. 10, the rotation induction device 1 for a vehicle in accordance with the embodiment of the present disclosure may further include a reinforcement part 80. The reinforcement part 80 may be formed in the center plate 30 and serve to increase the stiffness of the center plate 30.

The reinforcement part 80 in accordance with the embodiment of the present disclosure includes an upper reinforcement part 81 and a lower reinforcement part 82.

The upper reinforcement part 81 protrudes from the top surface of the center plate 30 so as to be contacted with the upper cover 12. The upper reinforcement part 81 may serve to increase the stiffness of the center plate 30, and may be directly contacted with the upper cover 12 so as to block damage to the center plate 30. For example, the upper reinforcement part 81 may have a curved surface to minimize the contact area with the upper cover 12. The upper reinforcement part 81 may correspond to the upper distribution part 61 of FIG. 7.

The lower reinforcement part 82 protrudes from the bottom surface of the center plate 30 so as to be contacted with the lower cover 22. The lower reinforcement part 82 may serve to increase the stiffness of the center plate 30, and may be directly contacted with the lower cover 22 so as to block damage to the center plate 30. For example, the lower reinforcement part 82 may have a curved surface to minimize the contact area with the lower cover 22. The lower reinforcement part 82 may correspond to the lower distribution part 62 of FIG. 7.

The reinforcement part 80 in accordance with the embodiment of the present disclosure may further include an inner reinforcement part 83 and an outer reinforcement part 84.

The inner reinforcement part 83 protrudes from the top and bottom of the inner circumferential surface of the center plate 30, and the outer reinforcement part 84 protrudes from the top and bottom of the outer circumferential surface of the center plate 30. The inner and outer reinforcement parts 83 and 84 may increase the stiffness of the inner and outer circumferential surfaces of the center plate 30.

The inner and outer reinforcement parts 83 and 84 are designed to have a height h1 smaller than the height h2 of the upper and lower reinforcement parts 81 and 82. At this time, when the upper and lower reinforcement parts 81 and 82 each have a curved surface, the contact surfaces of the upper and lower reinforcement parts 81 and 82 may correspond to the height h2 of the upper and lower reinforcement parts 81 and 82. When the inner and outer reinforcement parts 83 and 84 are designed to have the height h1 smaller than the height h2 of the upper and lower reinforcement parts 81 and 82, the inner and outer reinforcement parts 83 and 84 are not contacted with the upper and lower covers 12 and 22 at normal times. However, when the center plate 30 is deformed by an impact load, the inner and outer reinforcement parts 83 and 84 may be contacted with the upper and lower covers 12 and 22, thereby improving the durability of the center plate 30 and preventing a reduction in torque performance. The inner and outer reinforcement parts 83 and 84 may serve as walls for preventing a leak of the lubricant stored in the lubricant storage part 70 of FIG. 8.

Figure 11:
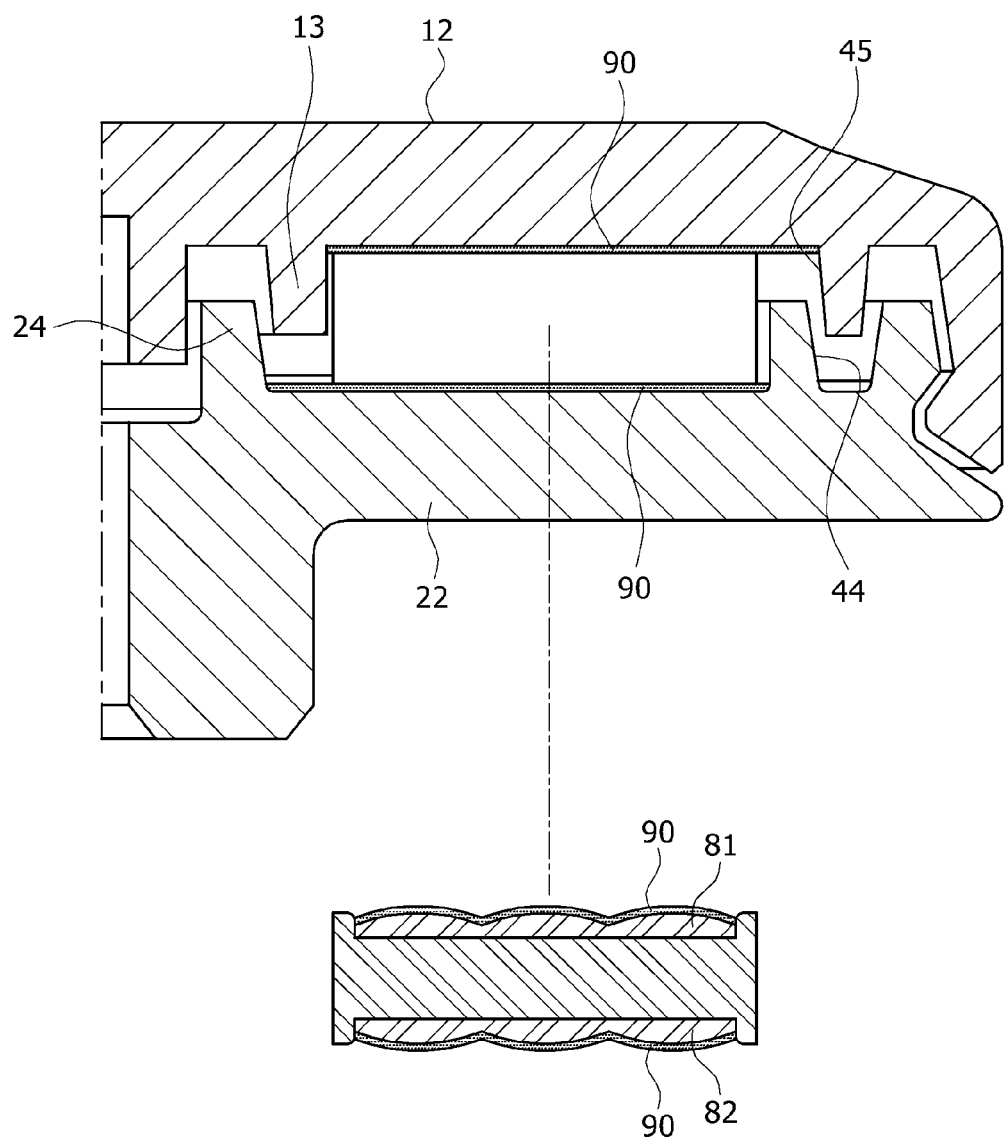
FIG. 11 is a diagram schematically illustrating a friction reduction part in accordance with the embodiment of the present disclosure.

FIG. 11 is a diagram schematically illustrating a friction reduction part in accordance with the embodiment of the present disclosure. Referring to FIG. 11, the rotation induction device 1 for a vehicle in accordance with the embodiment of the present disclosure may further include a friction reduction part 90. The friction reduction part 90 in accordance with the embodiment of the present disclosure is selectively disposed at the contact surface between the upper case 10 and the center plate 30 and at the contact surface between the center plate 30 and the lower case 20, and serves to reduce friction. That is, the friction reduction part 90 may be disposed between the upper case 10 and the center plate 30. Alternatively, the friction reduction part 90 may be disposed between the center plate 30 and the lower case 20.

The friction reduction part 90 may be applied to any one or more of the upper case 10, the center plate 30 and the lower case 20. The friction reduction part 90 may be formed of polytetrafluoroethylene. The friction reduction part 90 may serve to reduce torque, and omit a separate assembly process for friction reduction.

For example, the friction reduction part 90 may be applied to the bottom surface of the upper cover 12, formed between the upper protrusion 13 and the prevention upper protrusion 45. Alternatively, the friction reduction part 90 may be applied to the top surface of the lower cover 22, formed between the lower insertion part 24 and the prevention lower protrusion 44. Beside, the friction reduction part 90 may be applied to the contact surface between the upper and lower reinforcement parts 81 and 82 or the entire surfaces of the upper and lower reinforcement parts 81 and 82.

Figure 12:
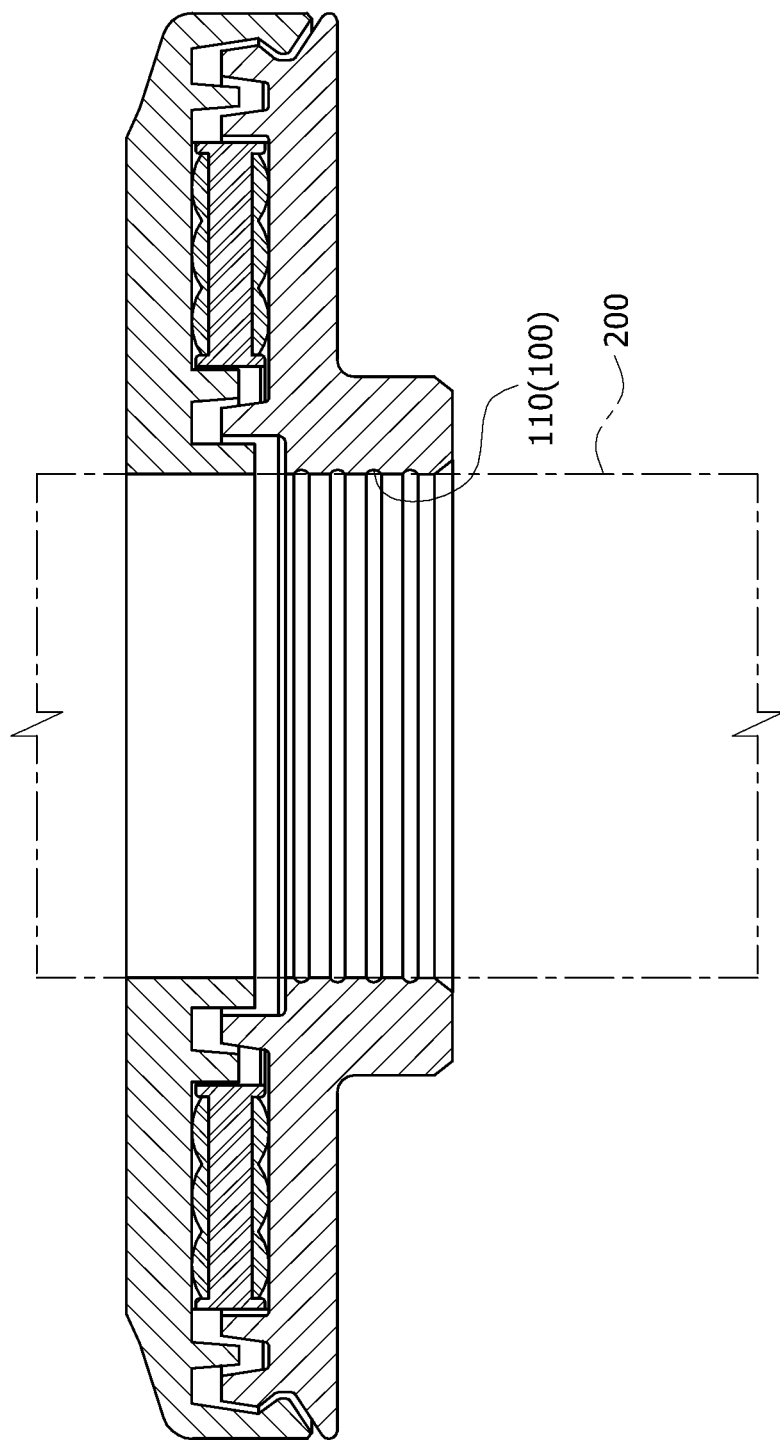
FIG. 12 is a diagram schematically illustrating a first embodiment of a load reduction part in accordance with the embodiment of the present disclosure.
Figure 13:
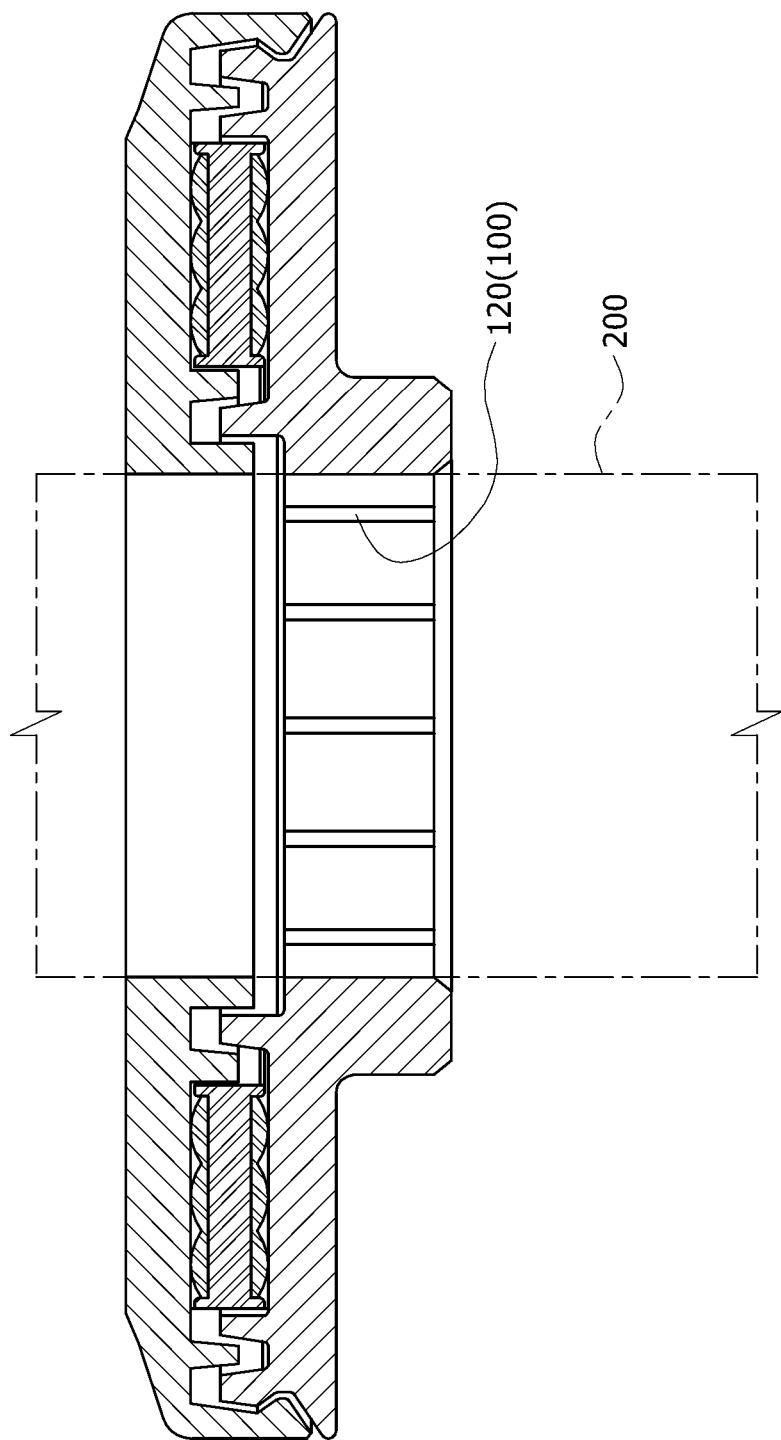
FIG. 13 is a diagram schematically illustrating a second embodiment of the load reduction part in accordance with the embodiment of the present disclosure.

FIG. 12 is a diagram schematically illustrating a first embodiment of a load reduction part in accordance with the embodiment of the present disclosure, and FIG. 13 is a diagram schematically illustrating a second embodiment of the load reduction part in accordance with the embodiment of the present disclosure. Referring to FIGS. 12 and 13, the rotation induction device 1 for a vehicle in accordance with the embodiment of the present disclosure may further include a load reduction part 100.

The load reduction part 100 in accordance with the embodiment of the present disclosure is formed in the lower case 20, and serves to reduce a load and to maintain a gap with the piston rod 200. That is, a plurality of load reduction parts 100 may be formed inside the lower through-part 21, and recessed so as to be spaced apart from one another.

For example, the load reduction part 100 may be formed as a groove in the inner circumferential surface of the lower through-part 21 when the lower case 20 is injection-molded. When the load reduction part 100 is formed in the lower through-part 21, the lower through-part 21 may maintain a gap with the piston rod 200, and the weight of the lower case 20 may be reduced.

The load reduction part 100 (hereafter, referred to as first load reduction part 110) in accordance with the first embodiment is formed in the circumferential direction along the inner circumferential surface of the lower through-part 21. For example, a plurality of first load reduction parts 110 may be vertically disposed so as to correspond to the height of the lower through-part 21.

The load reduction part 100 (hereafter, referred to as second load reduction part 120) accordance with the second embodiment is formed in the top-to-bottom direction along the inner circumferential surface of the lower through-part 21. For example, a plurality of second load reduction parts 120 may be disposed along the inner circumferential surface of the lower through-part 21 so as to be spaced apart from one another, and formed to have a length corresponding to the height of the lower through-part 21.

Besides, the first load reduction parts 110 and the second load reduction parts 120 may be mixedly used. If necessary, the first load reduction parts 110 and the second load reduction parts 120 may be formed on all or part of the inner circumferential surface of the lower through-part 21.

In the rotation induction device 1 for a vehicle in accordance with the embodiment of the present disclosure, the inflow prevention part 40 may be formed in the upper and lower cases 10 and 20 so as to prevent the inflow of foreign matters in a stepwise manner. Thus, the inflow prevention part 40 may block the foreign matter from penetrating into the sliding region, thereby preventing a reduction in rotational force.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A rotation induction device for a vehicle, comprising:
an upper case member having a piston rod disposed therethrough;
a lower case member, disposed under the upper case member and having the piston rod disposed therethrough;
a center plate, disposed between the upper and lower case members such that the piston rod passes through the center plate and configured to induce either one or both of the upper and lower case members to rotate;
an inflow prevention part, formed in the upper and lower case members, configured to block an inflow of foreign matters, and comprising a dropping inclined surface obliquely formed on an outermost side edge portion of the lower case member and overlapping a hook inclined surface formed on a prevention hook part extended downward from an edge of the upper case member; and
a lubricant storage part disposed at one or both of upper and lower surfaces of the center plate and configured to store lubricant therein,
wherein each of the upper case member, the lower case member, and the center plate comprises a synthetic resin material,
wherein the lubricant storage part comprises upper and lower storage parts on the upper and lower surfaces of the center plate, and
wherein the upper and lower storage parts each comprise a circumferential groove formed along a concentric circle and a radial groove in a radial shape, and the radial groove has a greater depth than the circumferential groove.

2. The rotation induction device of claim 1, wherein the upper case member comprises:
an upper through-part having an upper hole formed in a center thereof such that the piston rod passes through the upper hole;
an upper cover extended outward from the upper through-part, and configured to cover an upper surface of the center plate; and
an upper protrusion protruding downward from the upper cover, and configured to restrict movement of the center plate.

3. The rotation induction device of claim 1, wherein the lower case member comprises:
a lower through-part having a lower hole formed in a center thereof such that the piston rod passes through the lower hole;

a lower cover extended outward from the lower through-part, and configured to cover a lower surface of the center plate; and a lower protrusion protruding upward from the lower cover, and configured to restrict movement of the center plate.

4. The rotation induction device of claim 1, wherein the inflow prevention part comprises:

a prevention locking part formed at an edge of the lower case member, and formed as a groove to which the prevention hook part is locked and fixed; and a prevention dropping part extended from a bottom of the lower case member, and configured to drop foreign matters, introduced into the prevention locking part, downward.

5. The rotation induction device of claim 4, wherein the prevention hook part comprises the hook inclined surface formed thereon, and wherein the prevention dropping part comprises the dropping inclined surface facing the hook inclined surface to correspond to the hook inclined surface.

6. The rotation induction device of claim 4, wherein the inflow prevention part further comprises:

prevention lower protrusions protruding upward from the lower case member; and a prevention upper protrusion protruding downward from the upper case member, inserted between the prevention lower protrusions, and configured to prevent the inflow of foreign matters.

7. The rotation induction device of claim 1, further comprising a push prevention part formed in the upper case member to prevent a push of the upper case member.

8. The rotation induction device of claim 7, wherein the push prevention part comprises a plurality of push prevention parts, each spaced apart from another, and protruding toward the piston rod.

9. The rotation induction device of claim 8, wherein the push prevention parts are formed in a circumferential direction along an inner circumferential surface of the upper case member.

10. The rotation induction device of claim 8, wherein the push prevention parts are formed in a top-to-bottom direction along an inner circumferential surface of the upper case member.

11. A rotation induction device for a vehicle, comprising:

a first synthetic resin material member having a piston rod disposed therethrough;

a second synthetic resin material member, disposed under the first synthetic resin material member and having the piston rod disposed therethrough;

a third synthetic resin material member, disposed between the first and second synthetic resin material members such that the piston rod passes through the third synthetic resin material member and configured to induce either one or both of the first and second synthetic resin material members to rotate;

an inflow prevention part, formed in the first and second synthetic resin material members, configured to block an inflow of foreign matters, and comprising a dropping inclined surface obliquely formed on an outermost side edge portion of the second synthetic resin material member and overlapping a hook inclined surface formed on a prevention hook part extended downward from an edge of the first synthetic resin material member; and a lubricant storage part disposed at one or both of upper and lower surfaces of the third synthetic resin material member and configured to store lubricant therein, wherein the lubricant storage part comprises upper and lower storage parts on the upper and lower surfaces of the third synthetic resin material member, and wherein the upper and lower storage parts each comprise a circumferential groove formed along a concentric circle and a radial groove in a radial shape, and the radial groove has a greater depth than the circumferential groove.

12. The rotation induction device of claim 11, further comprising a push prevention part formed in the first synthetic resin material member to prevent a push of the first synthetic resin material member, wherein the first synthetic resin material member is an upper case member, the second synthetic resin material member is a lower case member, and the third synthetic resin material member is a center plate.

13. The rotation induction device of claim 11, wherein the first synthetic resin material member comprises:

an upper through-part having an upper hole formed in a center thereof such that the piston rod passes through the upper hole;

an upper cover extended outward from the upper through-part, and configured to cover an upper surface of the third synthetic resin material member; and an upper protrusion protruding downward from the upper cover, and configured to restrict movement of the third synthetic resin material member.

14. The rotation induction device of claim 11, wherein the second synthetic resin material member comprises:

a lower through-part having a lower hole formed in a center thereof such that the piston rod passes through the lower hole;

a lower cover extended outward from the lower through-part, and configured to cover a lower surface of the third synthetic resin material member; and a lower protrusion protruding upward from the lower cover, and configured to restrict movement of the third synthetic resin material member.

15. The rotation induction device of claim 11, wherein the inflow prevention part comprises:

a prevention locking part formed at an edge of the second synthetic resin material member, and formed as a groove to which the prevention hook part is locked and fixed; and a prevention dropping part extended from a bottom of the second synthetic resin material member, and configured to drop foreign matters, introduced into the prevention locking part, downward.

* * * * *